US010579611B2

(12) United States Patent
Ben-Rubi et al.

(10) Patent No.: US 10,579,611 B2
(45) Date of Patent: Mar. 3, 2020

(54) SELECTIVE EVENT LOGGING

(71) Applicant: WESTERN DIGITAL TECHNOLOGIES, INC., San Jose, CA (US)

(72) Inventors: Refael Ben-Rubi, Rosh Haayin (IL); Moshe Cohen, Modi'in (IL); Ahiad Turgeman, Beer Sheva (IL); Uri Shir, Ra'anana (IL); David Chaim Brief, Modi'in (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 187 days.

(21) Appl. No.: 15/614,044

(22) Filed: Jun. 5, 2017

(65) Prior Publication Data

US 2018/0349429 A1 Dec. 6, 2018

(51) Int. Cl.
G06F 11/00 (2006.01)
G06F 16/23 (2019.01)
G06F 11/34 (2006.01)
G06F 11/30 (2006.01)

(52) U.S. Cl.
CPC ...... G06F 16/2358 (2019.01); G06F 11/3072 (2013.01); G06F 11/3476 (2013.01); G06F 16/2308 (2019.01); G06F 2201/86 (2013.01)

(58) Field of Classification Search
CPC ............ G06F 11/3476; G06F 11/3636; G06F 11/2252; G06F 11/2278; G06F 11/2284
See application file for complete search history.

(56) References Cited

U.S. PATENT DOCUMENTS

| 4,108,359 | A | * | 8/1978 | Proto | G06F 11/25 714/50 |
| 6,530,076 | B1 | * | 3/2003 | Ryan | G06F 11/28 712/227 |
| 6,662,314 | B1 | | 12/2003 | Iwata et al. | |
| 8,359,584 | B2 | | 1/2013 | Rao et al. | |
| 8,589,890 | B2 | * | 11/2013 | Eccles | G06F 11/3636 711/117 |
| 8,850,398 | B1 | * | 9/2014 | L'Heureux | G06F 11/3692 705/7.25 |

(Continued)

OTHER PUBLICATIONS

Notice of Allowance dated Jul. 29, 2019, in U.S. Appl. No. 15/825,490.

(Continued)

Primary Examiner — Christopher S McCarthy
(74) Attorney, Agent, or Firm — Vierra Magen Marcus LLP

(57) ABSTRACT

An apparatus includes one or more processors configured to execute instructions to generate a plurality of event results that includes a first event result and a second event result. The apparatus further includes a first buffer coupled to the one or more processors and a second buffer coupled to the first buffer. The first buffer is configured to store the plurality of event results. The apparatus further includes a circuit coupled to the first buffer. The first buffer is further configured to provide the first event result to the second buffer in response to detection by the circuit of a failure condition associated with the first event result.

20 Claims, 4 Drawing Sheets

(56) References Cited

U.S. PATENT DOCUMENTS

| | | | |
|---|---|---|---|
| 2003/0046610 A1* | 3/2003 | Yamamoto | G06F 11/28 714/34 |
| 2005/0063300 A1* | 3/2005 | Dominic | H04L 29/12292 370/216 |
| 2006/0048012 A1 | 3/2006 | Barton et al. | |
| 2006/0085689 A1* | 4/2006 | Bjorsne | G06F 11/0748 714/39 |
| 2008/0282236 A1* | 11/2008 | Neft | G06F 11/28 715/155 |
| 2008/0316926 A1* | 12/2008 | Zhao | H01L 1/0003 370/232 |
| 2008/0320088 A1* | 12/2008 | Jung | H04L 51/12 709/206 |
| 2012/0079324 A1* | 3/2012 | Aphale | G06F 11/3636 714/26 |
| 2012/0226838 A1* | 9/2012 | Visalli | G06F 11/364 710/110 |
| 2014/0012864 A1* | 1/2014 | Nakagawa | G06F 16/24568 707/754 |
| 2014/0013011 A1* | 1/2014 | Hopkins | G06F 11/3636 710/14 |
| 2014/0013172 A1 | 1/2014 | Hopkins | |
| 2014/0052930 A1* | 2/2014 | Gulati | G06F 11/22 711/141 |
| 2014/0068345 A1* | 3/2014 | Miller | G06F 11/3636 714/45 |
| 2014/0068567 A1* | 3/2014 | Smith | G06F 8/75 717/128 |
| 2014/0157036 A1* | 6/2014 | Walton | G06F 11/0706 714/2 |
| 2015/0149812 A1 | 5/2015 | Arisoylu et al. | |
| 2017/0109258 A1* | 4/2017 | Martynov | G06F 11/3636 |
| 2017/0139991 A1* | 5/2017 | Teletia | G06F 16/24544 |
| 2017/0235561 A1* | 8/2017 | Butler | G06F 8/65 717/168 |
| 2018/0225063 A1* | 8/2018 | Singhvi | G06F 3/0656 |

OTHER PUBLICATIONS

Response to Office Action filed May 6, 2019, in U.S. Appl. No. 15/825,490.

Office Action dated Feb. 8, 2019, in U.S. Appl. No. 15/825,490.

* cited by examiner

SELECTIVE EVENT LOGGING

FIELD OF THE DISCLOSURE

This disclosure is generally related to electronic devices and more particularly to data storage devices.

BACKGROUND

Data storage devices enable users to store and retrieve data. Examples of data storage devices include volatile memory devices and non-volatile memory devices. A non-volatile memory may retain data after a power-down event, and a volatile memory may lose data after a power-down event.

Data storage devices are tested (or "debugged") using a test process. For example, read and write operations may be performed by a data storage device to generate log data (also referred to herein as test data) that indicates results of the read and write operations. A test computer may analyze the log data to determine whether the data storage device operates "as expected" (e.g., in compliance with a design specification).

In some cases, analyzing log data may be computationally complex because of the size of the log data. For example, analyzing the log data may take days or weeks. In some cases, analyzing all of the log data may be infeasible due to an engineering deadline.

DETAILED DESCRIPTION

A data storage device in accordance with aspects of the disclosure is configured to identify particular event results (e.g., log data) generated during operation of the data storage device. For example, event results may be analyzed to identify "successful" events (e.g., event results that indicate "expected" operation of the data storage device) and "failed" events (e.g., event results that indicate one or more failure conditions of the data storage device). Events may be generated during firmware execution by one or more processors of the data storage device, during operation of hardware of the data storage device, or both. To illustrate, event results may be generated during device operations such as address translation, generation or accessing of metadata (e.g., headers), non-volatile memory configuration operations, or intra-device communication operations (e.g., communications between one or more processors, one or more memories, or a non-volatile memory of the data storage device).

The data storage device may be configured to selectively delete event results of "successful" events and to "pass" or keep event results of failed events, such as by providing the event results of failed events to a test device or to a non-volatile memory of the data storage device to be read out in response to a request (e.g., from a host device). As a result, a data size of the log data may be reduced, which may simplify analysis of the log data. Further, a storage capacity of a memory used to store the log data may be reduced, which may decrease size, complexity, and manufacturing cost associated with the data storage device.

Particular aspects of the disclosure are described below with reference to the drawings. In the description, common or similar features may be designated by common reference numbers. As used herein, "exemplary" may indicate an example, an implementation, and/or an aspect, and should not be construed as limiting or as indicating a preference or a preferred implementation.

Figure 1:
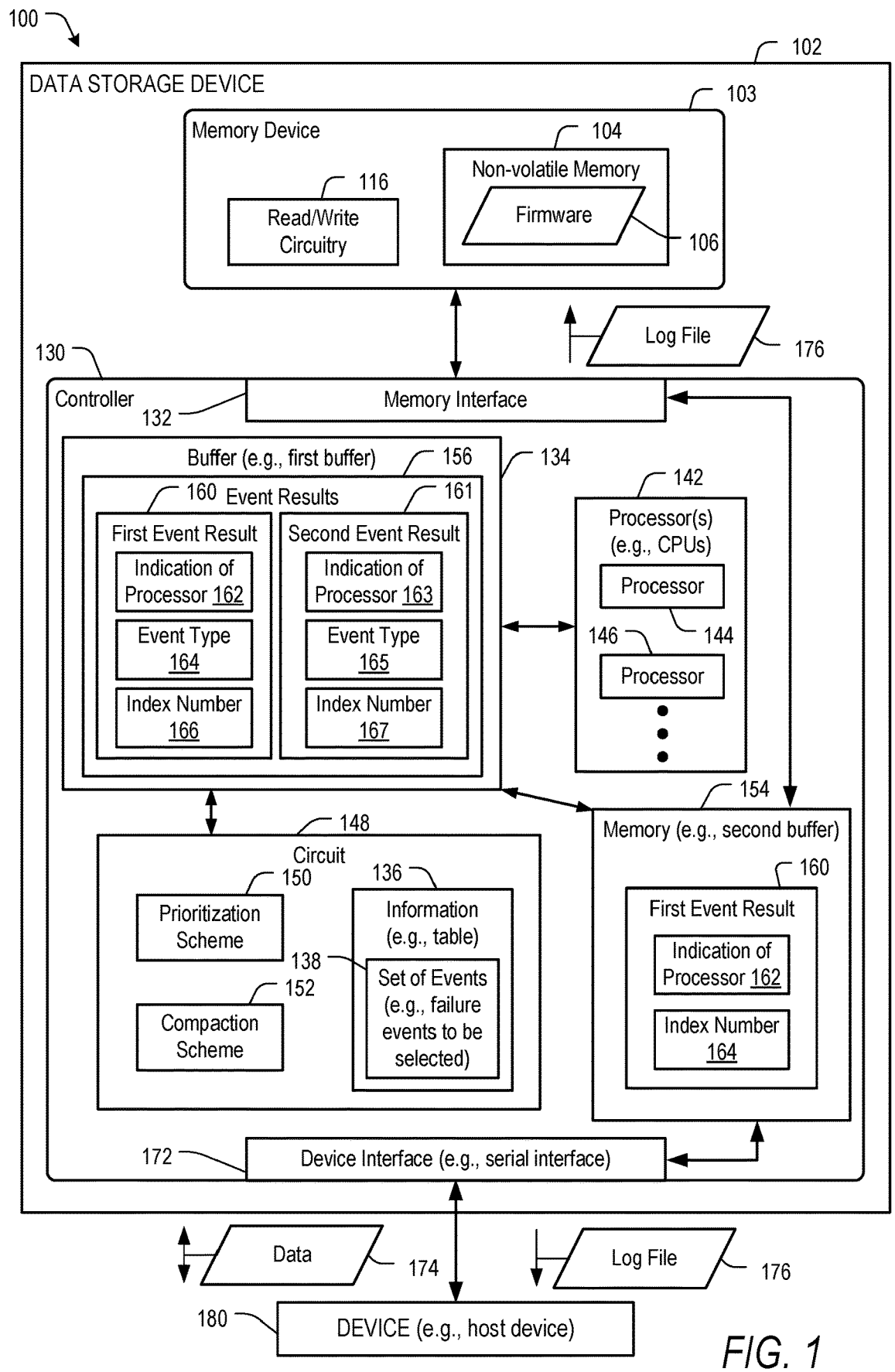
FIG. 1 is a diagram of a first illustrative example of a system including a data storage device that includes a circuit configured to perform selective event logging.

Referring to FIG. 1, a first illustrative example of system is depicted and generally designated 100. The system 100 includes a data storage device 102 (e.g., an apparatus) and a device 180 (e.g., a host device or an access device). The data storage device 102 includes a memory device 103 (e.g., one or more memory dies) and a controller 130. The controller 130 is coupled to the memory device 103. In some implementations, the data storage device 102 is integrated within the device 180, such as in connection with a solid-state drive (SSD) implementation.

The memory device 103 includes read/write circuitry 116 and a non-volatile memory 104, such as a non-volatile array of storage elements included in one or more memory dies. The non-volatile memory 104 may include a flash memory (e.g., a NAND flash memory) or a resistive memory, such as a resistive random access memory (ReRAM), as illustrative examples. The non-volatile memory 104 may have a three-dimensional (3D) memory configuration. As used herein, a 3D memory device may include multiple physical levels of storage elements (instead of having a single physical level of storage elements, as in a planar memory device). As an example, the non-volatile memory 104 may have a 3D vertical bit line (VBL) configuration. In a particular implementation, the non-volatile memory 104 is a non-volatile memory having a 3D memory array configuration that is monolithically formed in one or more physical levels of arrays of memory cells having an active area disposed above a silicon substrate. Alternatively, the non-volatile memory 104 may have another configuration, such as a two-dimensional (2D) memory configuration or a non-monolithic 3D memory configuration (e.g., a stacked die 3D memory configuration).

The non-volatile memory 104 includes one or more regions of storage elements. An example of a storage region is a block, such as a NAND flash erase group of storage elements, or a group of resistance-based storage elements in a ReRAM implementation. Another example of a storage region is a word line of storage elements (e.g., a word line of NAND flash storage elements or a word line of resistance-based storage elements). A storage region may have a single-level-cell (SLC) configuration, a multi-level-cell (MLC) configuration, or a tri-level-cell (TLC) configuration, as illustrative examples. Each storage element of the non-volatile memory 104 may be programmable to a state (e.g., a threshold voltage in a flash configuration or a resistive state in a resistive memory configuration) that indicates one or more values. As an example, in an illustrative TLC scheme, a storage element may be programmable to a state that indicates three values. As an additional example, in an illustrative MLC scheme, a storage element may be programmable to a state that indicates two values.

The controller 130 includes a memory interface 132 configured to communicate with the memory device 103 and further includes a device interface 172 configured to communicate with the device 180. The controller 130 is configured to receive data 174 from the device 180 via the device interface 172, such as in connection with a request for write access to the non-volatile memory 104. The controller 130 is configured to send the data 174 (or a representation of the data 174, such as an encoded representation of the data 174) to the memory device 103 (e.g., via the memory interface 132). The memory device 103 is configured to store the data 174 to the non-volatile memory 104.

The controller 130 is configured to access the data 174 from the non-volatile memory 104. As an illustrative example, the controller 130 may receive a request for read access to the data 174. The controller 130 may send a read command to the memory device 103 to initiate reading of the data 174. In response to the read command, the memory device 103 may sense the data 174 using the read/write circuitry 116 to generate sensed data. Depending on the particular implementation, the sensed data may include a set of hard bits representing the data 174, a set of soft bits representing the data 174, or both. In some cases, the sensed data may differ from the data 174 due to one or more bit errors.

The memory device 103 may provide the sensed data to the controller 130. The controller 130 is configured to receive the sensed data from the memory device 103 (e.g., via the memory interface 132). The controller 130 may be configured to decode the sensed data (e.g., by correcting one or more bit errors of the sensed data to generate the data 174) and to provide the decoded data to the device 180.

The controller 130 further includes one or more processors 142. For example, the one or more processors 142 may include a first processor 144 and a second processor 146. In other implementations, the one or more processors 142 may include a different number of processors (e.g., one processor, three processors, or another number of processors). In an illustrative example, the one or more processors 142 correspond to central processing units (CPUs) of the controller 130. The one or more processors 142 may be configured to control operations of the data storage device 102, such as by executing firmware of the data storage device 102 to perform, initiate, or control read operations, write operations, other operations, or a combination thereof.

The one or more processors 142 are configured to execute instructions, such as firmware 106 that may be retrieved from the non-volatile memory 104 or from a memory included in the controller 130, such as a read-only memory (ROM), as illustrative examples. The firmware 106 may include operational firmware (e.g. not a test program) that may be built from multiple firmware modules and that is run by the one or more processors 142. In some implementations, the firmware 106 may include a test program, such as instructions executable by the one or more processors 142 to perform operations of a built-in self-test (BIST), as an illustrative example.

The one or more processors 142 may execute instructions of the firmware 106 to perform certain operations that either succeed or fail, such as an operation to program data to the non-volatile memory 104 that results in a successful event (e.g., upon verification of writing the data to the non-volatile memory 104) or that results in a failure event (e.g., due to a write abort). As used herein, an operation performed by the data storage device 102 may succeed (resulting in a "successful event result") or may fail (resulting in a "failure event result"). Events may be generated during execution of the firmware 106 by the one or more processors 142, during operation of hardware of the data storage device 102, or both. Illustrative examples of operations that may generate event results include operations such as address translation, generation or accessing of metadata (e.g., one or more headers or other metadata that may be included in the data 174), configuration operations to configure the non-volatile memory 104, or intra-device communication operations (e.g., communications between the one or more processors 142, one or more memories of the data storage device 102, or the non-volatile memory 104).

In the example of FIG. 1, the controller 130 further includes a first buffer, such as a buffer 134. The buffer 134 is coupled to the one or more processors 142. The example of FIG. 1 also illustrates that the controller 130 includes a circuit 148 coupled to the buffer 134 and further includes a second buffer, such as a memory 154. The memory 154 is coupled to the buffer 134. The memory 154 may include a random access memory (RAM), as an illustrative example. The memory 154 may be further coupled to an interface of the data storage device 102, such as the memory interface 132, the device interface 172, or both.

During operation, the one or more processors 142 may execute instructions of the firmware 106. The one or more processors 142 are configured to execute instructions of the firmware 106 to generate a plurality of event results 156. For example, the plurality of event results 156 may include a first event result 160 and a second event result 161. In other implementations, plurality of event results 156 may include a different number of event results (e.g., three event results, four event results, or another number of event results). In a particular illustrative example, the first event result 160 corresponds to a failed operation performed during execution of instructions of the firmware 106, and the second event result 161 corresponds to a successful operation performed during execution of the instructions of the firmware 106. The buffer 134 is configured to store the plurality of event results 156.

A particular event result of the plurality of event results 156 may include information associated with an operation that generated the event result. To illustrate, the first event result 160 may include an indication 162 (e.g., a source field) of a particular processor of the one or more processors 142 that generated the first event result 160, an event type 164 (e.g., an integer number representing a type of event) of the first event result 160, and an index number 166 (e.g., a timestamp) that indicates a time or a sequence number associated with the first event result 160. The second event result 161 may include an indication 163 (e.g., a source field) of a particular processor of the one or more processors 142 that generated the second event result 161, an event type 165 (e.g., an integer number representing a type of event) of the second event result 161, and an index number 167 (e.g., a timestamp) that indicates a time or a sequence number associated with the second event result 161.

In the example of FIG. 1, the circuit 148 is configured to select the first event result 160 of the plurality of event results 156 based on a filtering policy that indicates a particular set of event results to be provided to the memory 154. To illustrate, the filtering policy may indicate that failure event results are to be provided to the memory 154 and that successful event results are to be excluded (or "filtered") from being provided to the memory 154. In this case, event results corresponding to "expected behavior" of the data storage device 102 may be excluded from being provided to the memory 154, and event results corresponding to "unexpected behavior" may be provided to the memory 154. As a non-limiting illustrative example, the filtering policy may indicate that event results of successful write operations to the non-volatile memory 104 are to be excluded from being provided to the memory 154 (and that event results of unsuccessful write operations to the non-volatile memory 104 are to be provided to the memory 154).

To further illustrate, the circuit 148 may be configured to delete particular event results of the plurality of event results 156 based on information 136. For example, the information 136 may correspond to an event table that identifies a set of events 138, such as failure event results. In this example, the circuit 148 may delete results of one or more events (e.g., the second event result 161) if the results are not indicated by the set of events 138. In this example, the circuit 148 is configured to delete the second event result 161 from the buffer 134 in response to determining that the second event result 161 is excluded from the set of events 138. In an alternate implementation, the set of events 138 may correspond to successful events, and the circuit 148 may be configured to delete the second event result 161 in response to determining that the second event result 161 is included in the set of events 138.

The buffer 134 is configured to provide the first event result 160 to the memory 154 in response to detection by the circuit 148 of a failure condition associated with the first event result 160. For example, the circuit 148 may be configured to determine that the first event result 160 is to be provided to the memory 154 based on a filtering policy that indicates a particular set of events (e.g., the set of events 138) to be provided to the memory 154. The filtering policy may indicate events (or types of events) associated with failure conditions, such as particular opcodes indicating that an event has failed. To further illustrate, the circuit 148 may be configured to determine that the second event result 161 is excluded from the particular set of events. In some implementations, the circuit 148 may provide a command to the buffer 134 that identifies the first event result 160. The command may indicate the index number 166, as an illustrative example. Alternatively or in addition, the command may indicate an address of the first event result 160. In another example, the circuit 148 may be configured to provide an enable signal to the buffer 134 to cause contents of the buffer 134 to be output to the memory 154. To illustrate, the circuit 148 may assert the enable signal (e.g., by adjusting a value of the enable signal from a logic zero value to a logic one value, or vice versa) to cause the buffer 134 to provide the first event result 160 to the memory 154.

In a particular example, the device interface 172 is configured to receive the first event result 160 from the memory 154. For example, the first event result 160 may be included in a log file 176 that is provided from the data storage device 102 to the device 180 via the device interface 172. The log file 176 may indicate results of operations performed by the data storage device 102 (e.g., operations performed by executing the firmware 106). In some implementations, the device interface 172 includes a serializer circuit and a serial interface. The serializer circuit may be configured to receive the log file 176 from the memory 154 and to generate serial data representing the log file 176, and the serial interface may be configured to provide the serial data to the device 180.

Alternatively or in addition to providing the first event result 160 to the device 180, the data storage device 102 may be configured to store the first event result 160 to the non-volatile memory 104. For example, the memory interface 132 may be configured to receive the first event result 160 from the memory 154 and to provide the log file 176 to the memory device 103 to be stored at the non-volatile memory 104. For example, the data storage device 102 may "back up" one or more copies of the log file 176. In some cases, the log file 176 may be read from the non-volatile memory 104 and may be provided to the device 180 (e.g., in response to a request for the log file 176 from the device 180).

In some implementations, the circuit 148 is configured to delete the second event result 161 from the buffer 134 based on a prioritization scheme 150. The prioritization scheme 150 may indicate priority of certain events. For example, the circuit 148 may delete the second event result 161 from the buffer 134 prior to deleting a third event result from the buffer 134 in response to determining, based on the prioritization scheme 150, that the second event result 161 has a lower priority than the third event result.

Alternatively or in addition to the prioritization scheme 150, the circuit 148 may be configured to delete the second event result 161 based on an identification of a particular processor of the one or more processors 142, such as based on the indication 162 or the indication 163. To illustrate, if event results associated with the first processor 144 are successful (e.g., confirming that the first processor 144 operates "as expected"), then each event result associated with the first processor 144 may be deleted from the memory 154. To further illustrate, the first processor 144 may be associated with an identification (ID) of "0," and the second processor 146 may be associated with an ID of "1." In this example, if operation of the first processor 144 is confirmed, the second event result 161 may be deleted from the buffer 134 in response to the indication 163 corresponding to "0."

Alternatively or in addition, the circuit 148 may be configured to delete the second event result 161 based on the index number 167 of the second event result 161. For example, in some cases, the data storage device 102 may perform a function that is associated with multiple event results. As an illustrative example, an operation to access a cache (e.g., a cache of the memory device 103 or a cache of the controller 130) may generate multiple event results, such as an event result associated with obtaining access to the cache and another event result associated with a read operation to the cache or a write operation to the cache. In this case, upon determination that the function is completed, multiple event results corresponding to the function may be deleted from the buffer 134. For example, in some implementations, the second event result 161 may indicate a "group number" that identifies the function, and the second event result 161 may be deleted based on the group number. In another example, the multiple event results may be deleted based on one or more of an indication of a processor that performed the function, an event type of the multiple event results, index numbers associated with the multiple event results, one or more other criteria, or a combination thereof. To illustrate, if a function performed by the first processor 144 is initiated at time 0 and is completed successfully at time 10, the circuit 148 may delete the second event result 161 from the buffer 134 based on the indication 163 corresponding to the first processor 144, based on the event type 165 corresponding to an operation of the function, and based on the index number 167 being within the range of time 0 and time 10.

Alternatively or in addition, the circuit 148 may be configured to perform operations at the buffer 134 based on a compaction scheme 152. For example, after deleting the second event result 161 from the buffer 134, the circuit 148 may copy (or "move") a third event result. To further illustrate, the buffer 134 may include a first address and a second address, where the first address is associated with the second event result 161. After deleting the second event result 161 from the first address, the circuit 148 may perform a compaction process by copying the third event result from the second address to the first address. In an illustrative example, the compaction process is performed as a background process (e.g., during performance of other operations at the data storage device 102).

In an illustrative example, a data capacity of the memory 154 is based on a number of events indicated by the information 136 (e.g., a table). For example, if the set of events 138 includes a relatively small number of events to be "passed" to the memory 154, a data capacity of the memory 154 may be decreased. Alternatively, if the set of events 138 includes a larger number of events to be "passed" to the memory 154, a data capacity of the memory 154 may be increased.

One or more aspects described with reference to FIG. 1 may improve device operation or may reduce device manufacturing cost or device complexity. For example, by selectively providing the first event result 160 to the memory 154 (e.g., upon deleting the second event result 161), a size of the log file 176 may be reduced as compared to technique that copies the entire contents of the buffer 134 to the memory 154. As a result, a storage capacity of the memory 154 may be reduced, which may reduce manufacturing cost or complexity of the data storage device 102.

Further, in some cases, reduced size of the log file 176 may enable use of an efficient technique to provide the log file 176 to the device 180. For example, in some cases, a device may use a relatively large parallel interface to send an entire log file to a testing computer (since sending the entire log file to the testing computer using a serial interface may use a large amount of time). By reducing a size of the log file 176, the data storage device 102 may send the log file 176 using a serial interface in a relatively small amount of time. As a result, a number of connections of the device interface 172 may be reduced, which may reduce manufacturing cost or complexity of the data storage device 102.

Figure 2:
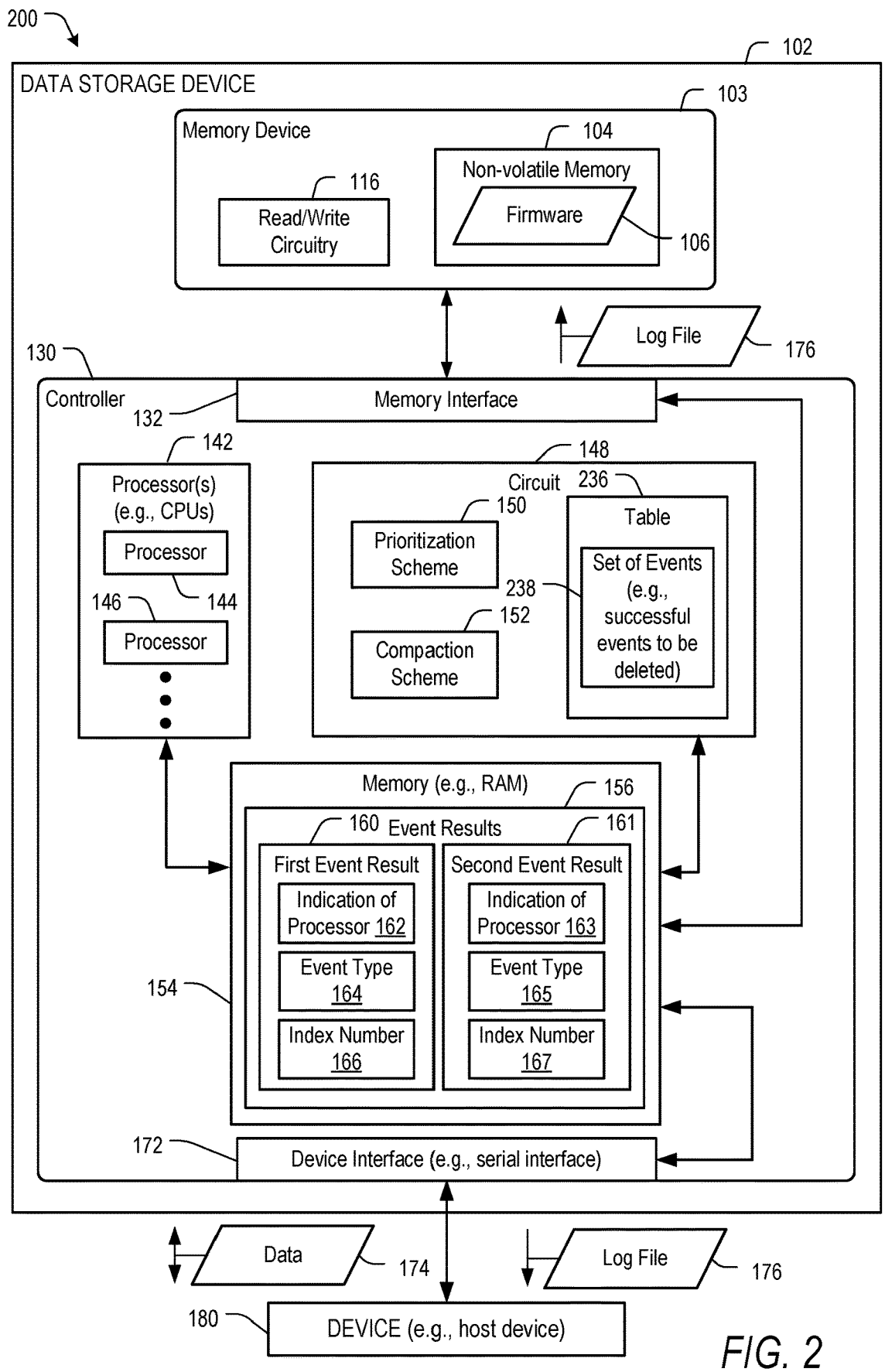
FIG. 2 is a diagram of a second illustrative example of a system including a data storage device that includes a circuit configured to perform selective event logging.

Referring to FIG. 2, a second illustrative example of system is depicted and generally designated 200. The system 200 includes the data storage device 102 and the device 180. In the second example of FIG. 2, the buffer 134 of FIG. 1 may be omitted from the data storage device 102. For example, in FIG. 2, the one or more processors 142 may be coupled to the memory 154 (instead of being coupled to the buffer 134). The second example of FIG. 2 may correspond to an implementation in which event results are provided directly to the memory 154 by the one or more processors 142 (e.g., instead of buffering the event results at the buffer 134).

During operation, the one or more processors 142 may execute instructions to generate the plurality of event results 156. For example, the one or more processors 142 may execute instructions of the firmware 106 to generate the plurality of event results 156. Alternatively or in addition, one or more event results may be generated by a hardware module, by a "sniffer" circuit or device (e.g., a bus sniffer circuit), by one or more other circuits or devices, or any combination thereof. The plurality of event results includes the first event result 160 and the second event result 161.

The controller 130 may be configured to store the plurality of event results 156 at the memory 154. In the example of FIG. 2, the circuit 148 is configured to access a table 236 to determine one or more event results of the plurality of event results 156 to be discarded (e.g., deleted) from the memory 154. To illustrate, the table 236 may indicate a set of events 238, such as successful events that correspond to "expected" behavior of the data storage device 102. The circuit 148 may be configured to delete the second event result 161 from the memory 154 in response determining that the table 236 indicates an event corresponding to the second event result 161 (e.g., in response to identifying the event corresponding to the second event result 161 in the set of events 238).

After deleting one or more event results (e.g., the second event result 161) from the memory 154, one or more event results may be provided from the memory 154 to one or more other devices or device components. For example, the log file 176 may include the first event result 160, and the log file 176 may be provided to the device 180 via the device interface 172, to the memory device 103 via the memory interface 132, or both.

In some implementations, the circuit 148 is configured to delete the second event result 161 from the memory 154 based on the prioritization scheme 150. The prioritization scheme 150 may indicate priority of certain events. For example, the circuit 148 may delete the second event result 161 from the memory 154 prior to deleting a third event result from the memory 154 in response to determining, based on the prioritization scheme 150, that the second event result has a lower priority than the third event result.

Alternatively or in addition to the prioritization scheme 150, the circuit 148 may be configured to delete the second event result 161 based on an identification of a particular processor of the one or more processors 142, such as based on the indication 162 or the indication 163. To illustrate, if event results associated with the first processor 144 are successful (e.g., confirming that the first processor 144 operates "as expected"), then each event result associated with the first processor 144 may be deleted from the memory 154. To further illustrate, the first processor 144 may be associated with an ID of "0," and the second processor 146 may be associated with an ID of "1." In this example, if operation of the first processor 144 is confirmed, the second event result 161 may be deleted from the memory 154 in response to the indication 163 corresponding to "0."

Alternatively or in addition, the circuit 148 may be configured to delete the second event result 161 based on the index number 167 of the second event result. For example, in some cases, the data storage device 102 may perform a function that is associated with multiple event results. As an illustrative example, an operation to access a cache (e.g., a cache of the memory device 103 or a cache of the controller 130) may generate multiple event results, such as an event result associated with obtaining access to the cache and another event result associated with a read operation to the cache or a write operation to the cache. In this case, upon determination that the function is completed, multiple event results corresponding to the function may be deleted from the memory 154. For example, in some implementations, the second event result 161 may indicate a "group number" that identifies the function, and the second event result 161 may be deleted based on the group number. In another example, the multiple event results may be deleted based on one or more of an indication of a processor that performed the function, an event type of the multiple event results, index numbers associated with the multiple event results, one or more other criteria, or a combination thereof. To illustrate, if a function performed by the first processor 144 is initiated at time 0 and is completed successfully at time 10, the circuit 148 may delete the second event result 161 from the memory 154 based on the indication 163 corresponding to the first processor 144, based on the event type 165 corresponding to an operation of the function, and based on the index number 167 being within the range of time 0 and time 10.

Alternatively or in addition, the circuit 148 may be configured to perform operations at the memory 154 based on the compaction scheme 152. For example, after deleting the second event result 161 from the memory 154, the circuit 148 may copy (or "move") a third event result. To further illustrate, the memory 154 may include a first address and a second address, where the first address is associated with the second event result 161. After deleting the second event result 161 from the first address, the circuit 148 may perform a compaction process by copying the third event result from the second address to the first address. In an illustrative example, the compaction processor is performed as a background process (e.g., during performance of other operations to write event results to the memory 154 or to delete event results from the memory 154).

In an illustrative example, a data capacity of the memory 154 is based on a number of events indicated by the table 236. For example, if the set of events 238 includes a relatively large of events to be deleted from the memory 154, a data capacity of the memory 154 may be decreased. Alternatively, if the set of events 238 includes a smaller number of events to be deleted from the memory 154, a data capacity of the memory 154 may be increased.

The example of FIG. 2 illustrates that event results may be provided selectively by deleting one or more event results from the memory 154. As a result, a size of the log file 176 may be reduced, which may enable reduced storage capacity of the memory 154, as an illustrative example.

Figure 3:
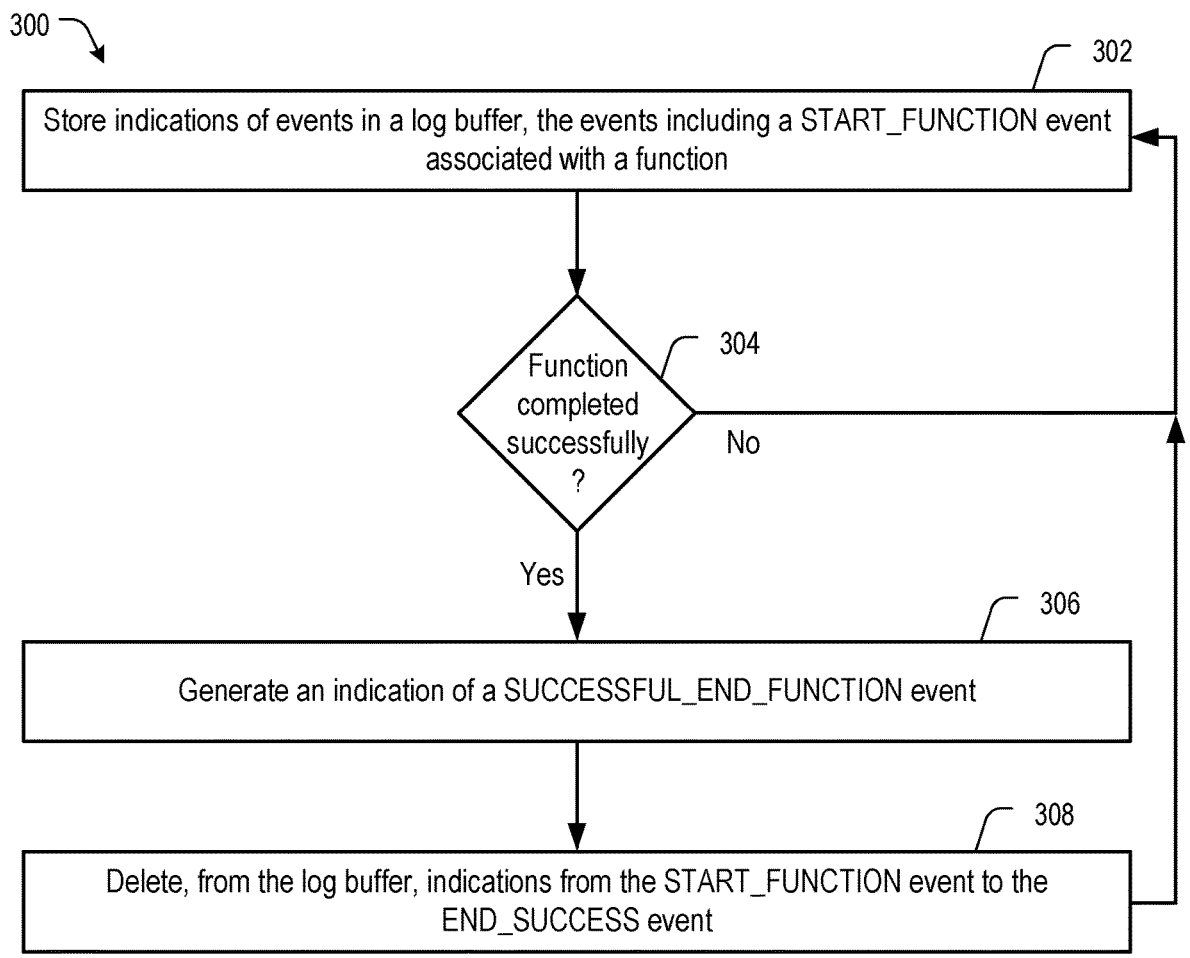
FIG. 3 is a flow chart of a particular illustrative example of a method of operation of the data storage device of FIG. 1, the data storage device of FIG. 2, or both.

Referring to FIG. 3, an illustrative example of a method is depicted and generally designated 300. The method 300 may be performed by the data storage device 102 of FIG. 1 or by the data storage device 102 of FIG. 2, as illustrative examples.

The method 300 includes storing indications of events in a log buffer, at 302. The events include a START_FUNCTION event associated with a function. As used herein, a "log buffer" may refer to a hardware buffer, such as the buffer 134 of FIG. 1, or to a logical buffer, such as a logical buffer corresponding to the log file 176.

A START_FUNCTION event may correspond to an event of a function that indicates another event of the function is to follow. For example, a START_FUNCTION event may correspond to an operation to access a cache (e.g., to read from the cache or to write to the cache). The operation to access the cache may be followed with an event that indicates the operation to read the cache has been successful (SUCCESSFUL_END_FUNCTION) or that the operation to read the cache has failed (FAILED_END_FUNCTION). In a particular example, the one or more processors 142 execute instructions of the firmware 106 to generate an event result of the plurality of event results 156 that indicates the START_FUNCTION event.

To further illustrate, Table 1 illustrates certain aspects that may be associated with the method 300. The leftmost column of Table 1 includes function names, such as function names corresponding to the index numbers 166, 167 of FIG. 1. The middle column of Table 1 includes events that indicate a function has been initiated (or "entered") (START_FUNCTION), and the rightmost column of Table 1 includes events that indicate a function has been completed successfully (or "exited"). In some cases, Table 1 corresponds to a table stored by the controller 130. For example, Table 1 may correspond to the table 236 of FIG. 2, and entries of Table 1 may correspond to the set of events 238.

TABLE 1

| Function name | Event at entry to function "START_FUNCTION" | Event at exit from function "SUCCESSFUL_END_FUNCTION" |
| --- | --- | --- |
| f_Read_cache | ENTERED_READ_CACHE | EXIT_READ_CACHE |
| f_Read_wo_cache | ENTERED_READ_WO_CACHE | EXIT_READ_WO_CACHE |
| f_Write_cache | ENTERED_WRITE_CACHE | EXIT_WRITE_CACHE |
| f_Write_wo_cache | ENTERED_WRITE_WO_CACHE | EXIT_WRITE_WO_CACHE |

The method 300 includes determining whether the function has been completed successfully, at 304. For example, if the function is to read from (or write to) a cache, then the function has been completed successfully upon reading to (or writing from) the cache. In this example, the function may be unsuccessful if the cache has not been read from (or written to) successfully, such as if access is "blocked" by another operation to the cache, as an illustrative example.

The method 300 further includes generating an indication of a SUCCESSFUL_END_FUNCTION event, at 306. For example, the one or more processors 142 may execute instructions of the firmware 106 to generate an event result of the plurality of event results 156 that indicates the function is successful.

The method 300 further includes deleting, from the log buffer, indications from the START_FUNCTION event to the SUCCESSFUL_END_FUNCTION event, at 308. For example, because the function is completed successfully, results of the function may be deleted from the buffer 134, as described with reference to FIG. 1, or from the memory 154, as described with reference to FIG. 2. Other event results corresponding to "unexpected" behavior (e.g., results of a failed event) may be retained at the log buffer (instead of deleting the results).

Figure 4:
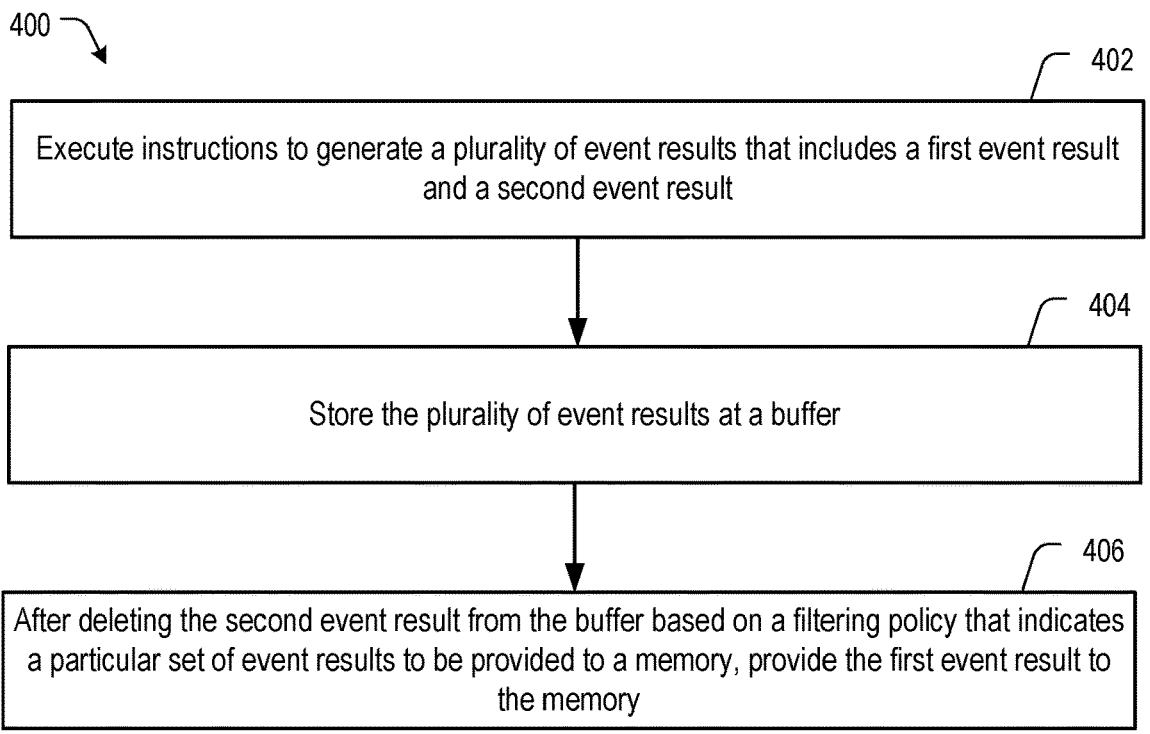
FIG. 4 is a flow chart of a particular illustrative example of a method of operation of the data storage device of FIG. 1.

Referring to FIG. 4, an illustrative example of a method is depicted and generally designated 400. The method 400 may be performed by the data storage device 102 of FIG. 1, as an illustrative example.

The method 400 includes executing instructions to generate a plurality of event results that includes a first event result and a second event result, at 402. For example, the one or more processors 142 may execute instructions of the firmware 106 to generate the plurality of event results 156.

The method 400 further includes storing the plurality of event results at a buffer, at 404. For example, the plurality of event results 156 may be stored at the buffer 134.

The method 400 further includes providing the first event result to a memory after deleting the second event result from the buffer based on a filtering policy that indicates a particular set of event results to be provided to the memory, at 406. For example, the second event result 161 may be deleted from the buffer 134 of FIG. 1.

In a particular implementation, the set of events 138 may indicate events to be "filtered" (or excluded) from being provided to the memory 154. In this case, the second event result 161 may be deleted based on a filtering policy that indicates that event results corresponding to the set of events 138 are to be deleted from the buffer 134. In another implementation, the set of events 138 may indicate events to be "passed" to the memory 154. In this example, the second event result 161 may be deleted based on a determination that an event corresponding to the second event result 161 is not indicated by the set of events 138.

Figure 5:
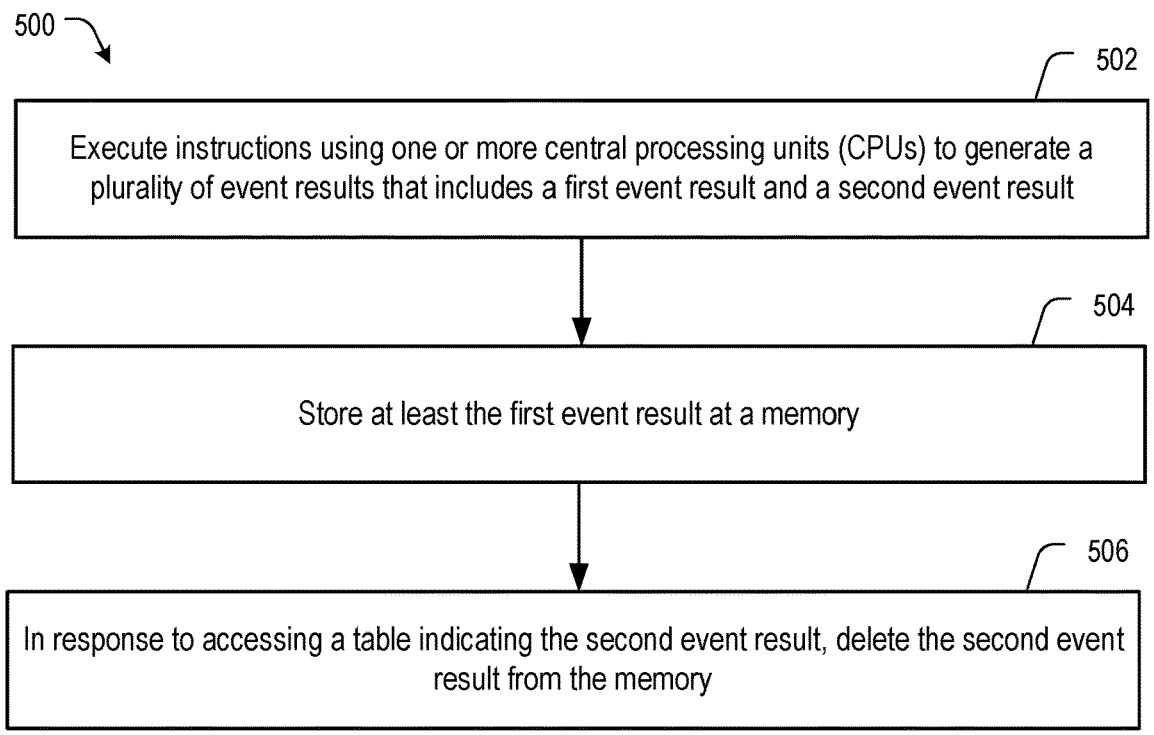
FIG. 5 is a flow chart of a particular illustrative example of a method of operation of the data storage device of FIG. 2.

Referring to FIG. 5, an illustrative example of a method is depicted and generally designated 500. The method 500 may be performed by the data storage device 102 of FIG. 2, as an illustrative example.

The method 500 includes executing instructions using one or more CPUs to generate a plurality of event results that includes a first event result and a second event result, at 502. For example, the one or more processors 142 may execute instructions of the firmware 106 to generate the plurality of event results 156.

The method 500 further includes storing the plurality of event results at a memory, at 504. For example, the plurality of event results 156 may be stored at the memory 154.

The method 500 further includes deleting the second event result from the memory in response to accessing a table indicating the second event result, at 506. For example, the circuit 148 may be configured to delete the second event result 161 from the memory 154 in response to accessing the table 236. In this example, the set of events 238 may indicate that results of particular events are to be deleted from the memory 154. The circuit 148 may be configured to delete the second event result 161 in response to determining that the set of events 238 includes an indication of an event corresponding to the second event result 161.

In some implementations, the method 500 further includes providing the first event result to an interface after deleting the second event result from the memory. For example, the first event result 160 may be provided to the device interface 172 after deleting the second event result 161 from the memory 154. In this example, the method 500 may further include providing the first event result 160 from the device interface 172 to the device 180 after deleting the second event result 161 from the memory 154. Alternatively or in addition, the first event result 160 may be provided to the memory interface 132 after deleting the second event result 161 from the memory 154. In this example, the method 500 may further include providing the first event result 160 from the memory interface 132 to the non-volatile memory 104 after deleting the second event result 161 from the memory 154.

In conjunction with the described embodiments, an apparatus includes means (e.g., the one or more processors 142) for executing instructions (e.g., instructions of the firmware 106, other instructions, or a combination thereof) to generate a plurality of event results (e.g., the plurality of event results 156) that includes a first event result (e.g., the first event result 160) and a second event result (e.g., the second event result 161). The apparatus further includes means (e.g., the memory 154) for storing the plurality of event results. The apparatus further includes means (e.g., the circuit 148) accessing a table (e.g., the table 236) and for discarding the second event result from the means for storing based on the table indicating that the second event result. The apparatus may further include means (e.g., the memory interface 132) for providing the first event result to a non-volatile memory (e.g., the non-volatile memory 104) after discard of the second event result. Alternatively or in addition, the apparatus may further include means (e.g., the device interface 172) for providing the first event result to an access device (e.g., the device 180) after discard of the second event result.

Although various components depicted herein are illustrated as block components and described in general terms, such components may include one or more microprocessors, state machines, or other circuits configured to enable such components to perform one or more operations described herein. For example, certain aspects of the circuit 148 may represent physical components, such as hardware controllers, state machines, logic circuits, or other structures, to enable the controller 130 to selectively filter event results.

As an illustrative example, the circuit 148 may include a comparator circuit configured to compare entries of the information 136 or the table 236 to indications of the plurality of event results 156. For example, the comparator circuit may be configured to compare each event of the set of events 138 or the set of events 238 to the event type 164 and to the event type 165 (e.g., to determine a "match"). The comparator circuit may be configured to generate an output signal having a particular value that indicates whether an event result is to be deleted or "passed." For example, a logic one value of the output signal may indicate that the event type 165 is excluded from the set of events 138 or that the event type 165 is indicated by the set of events 238. The output signal may be provided to a control circuit that is coupled to the comparator circuit. The control circuit may be configured to delete the second event result 161 in response to the logic one value of the output signal. After deleting the second event result 161, the control circuit may be configured to provide an enable signal to the buffer 134 to cause the buffer 134 to output contents of the buffer 134 (e.g., the first event result 160) to the memory 154. In another example, the control circuit may be configured to provide an enable signal to the memory 154 to cause the memory 154 to output contents of the memory 154 (e.g., the first event result 160) to the non-volatile memory 104 or to the device 180. In another example, the control circuit may be configured to provide a status signal to the device 180 via the device interface 172 to indicate to the device 180 that contents of the memory 154 are ready to be accessed by the device 180.

Alternatively or in addition, certain aspects of the circuit 148 may be implemented using a microprocessor or microcontroller. In a particular embodiment, one or more aspects of the circuit 148 may be implemented using a processor executing instructions (e.g., firmware) that are stored at the non-volatile memory 104. Alternatively, or in addition, executable instructions that are executed by the processor may be stored at a separate memory location that is not part of the non-volatile memory 104, such as at a read-only memory (ROM) that may be included in the controller 130.

The data storage device 102 may be coupled to, attached to, or embedded within one or more accessing devices, such as within a housing of the device 180. For example, the data storage device 102 may be embedded within the device 180 in accordance with a Joint Electron Devices Engineering Council (JEDEC) Solid State Technology Association Universal Flash Storage (UFS) configuration. To further illustrate, the data storage device 102 may be integrated within an electronic device (e.g., the device 180), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 may be implemented in a portable device configured to be selectively coupled to one or more external devices, such as a host device. For example, the data storage device 102 may be removable from the device 180 (i.e., "removably" coupled to the device 180). As an example, the data storage device 102 may be removably coupled to the device 180 in accordance with a removable universal serial bus (USB) configuration.

The device 180 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The device 180 may communicate via a controller, which may enable the device 180 to communicate with the data storage device 102. The device 180 may operate in compliance with a JEDEC Solid State Technology Association industry specification, such as an embedded MultiMedia Card (eMMC) specification or a Universal Flash Storage (UFS) Host Controller Interface specification. The device 180 may operate in compliance with one or more other specifications, such as a Secure Digital (SD) Host Controller specification as an illustrative example. Alternatively, the device 180 may communicate with the data storage device 102 in accordance with another communication protocol. In some implementations, the data storage device 102 may be integrated within a network-accessible data storage system, such as an enterprise data system, an NAS system, or a cloud data storage system, as illustrative examples.

In some implementations, the data storage device 102 may include a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the data storage device 102 may be coupled to the device 180 via a network. For example, the network may include a data center storage system network, an enterprise storage system network, a storage area network, a cloud storage network, a local area network (LAN), a wide area network (WAN), the Internet, and/or another network.

To further illustrate, the data storage device 102 may be configured to be coupled to the device 180 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The non-volatile memory 104 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. The non-volatile memory 104 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where they direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
   a non-volatile memory containing firmware of the data storage device;
   one or more processors coupled to the non-volatile memory, the one or more processors configured to execute instructions of the firmware to generate a plurality of event results that includes a first event result and a second event result;
   a first buffer coupled to the one or more processors and configured to store the plurality of event results;
   a second buffer coupled to the first buffer; and
   a circuit coupled to the first buffer,
   wherein the first buffer is further configured to:
      provide the first event result to the second buffer in response to detection by the circuit of a failure condition associated with the first event result, wherein detection of the failure condition includes finding the first event result in an event table; and
      discard the second event result in response to detection by the circuit of a success condition associated with the second event result, wherein detection of the success condition includes failing to find the second event result in the event table, the success condition indicating successful execution of firmware instructions by the one or more processors.

2. The data storage device of claim 1, wherein the circuit is further configured to determine that the first event result is to be provided to the second buffer based on a filtering policy that indicates a particular set of events to be provided to the second buffer.

3. The data storage device of claim 2, wherein the circuit is further configured to determine that the second event result is excluded from the particular set of events.

4. The data storage device of claim 1, wherein:
the first event result corresponds to a failed write operation in the non-volatile memory performed during execution of the firmware.

5. The data storage device of claim 4, wherein the second event result corresponds to a successful write operation in the non-volatile memory performed during execution of the firmware.

6. The data storage device of claim 1, further comprising an interface configured to receive the first event result from the second buffer.

7. The data storage device of claim 6, wherein the interface is further configured to provide the first event result to an access device.

8. The data storage device of claim 6, further comprising:
a controller that includes the one or more processors, the first buffer, the second buffer, the circuit, and the interface, wherein the interface is further configured to provide the first event result to the non-volatile memory.

9. A method comprising:
executing firmware instructions of a data storage device using one or more central processing units (CPUs) of the data storage device to generate a plurality of event results that includes a first event result and a second event result;
storing the plurality of event results at a memory of the data storage device;
in response to finding the first event result in an event table, maintaining the first event result at the memory; and
in response to failing to find the second event result in the event table, deleting the second event result from the memory.

10. The method of claim 9, wherein:
the first event result corresponds to a failed operation performed during execution of the firmware.

11. The method of claim 10, wherein the second event result corresponds to a successful operation performed during execution of the firmware.

12. The method of claim 9, further comprising providing the first event result to an interface after deleting the second event result from the memory.

13. The method of claim 12, further comprising providing the first event result from the interface to an access device.

14. The method of claim 12, further comprising providing the first event result from the interface to a non-volatile memory.

15. The method of claim 9, further comprising initiating a compaction process at the memory after deleting the second event result from a first address, the compaction process including copying a third event result to the first address.

16. The method of claim 15, wherein the compaction process is performed as a background process.

17. The method of claim 9, wherein a data capacity of the memory is based on a number of events indicated by the table.

18. An apparatus comprising:
means for executing data storage device firmware instructions to generate a plurality of event results that includes a first event result and a second event result;
means for storing the plurality of event results; and
means for accessing a table and for discarding the second event result from the means for storing based on the table indicating the second event result, the table indicating a set of successful events associated with successful execution of one or more of the data storage device instructions by the means for executing instructions.

19. The apparatus of claim 18, further comprising means for providing the first event result to a non-volatile memory after discard of the second event result.

20. The apparatus of claim 18, further comprising means for providing the first event result to an access device after discard of the second event result.

* * * * *